May 25, 1965 E. R. ANDERSON 3,185,195
PEACH PITTER
Original Filed Aug. 6, 1956 5 Sheets-Sheet 1
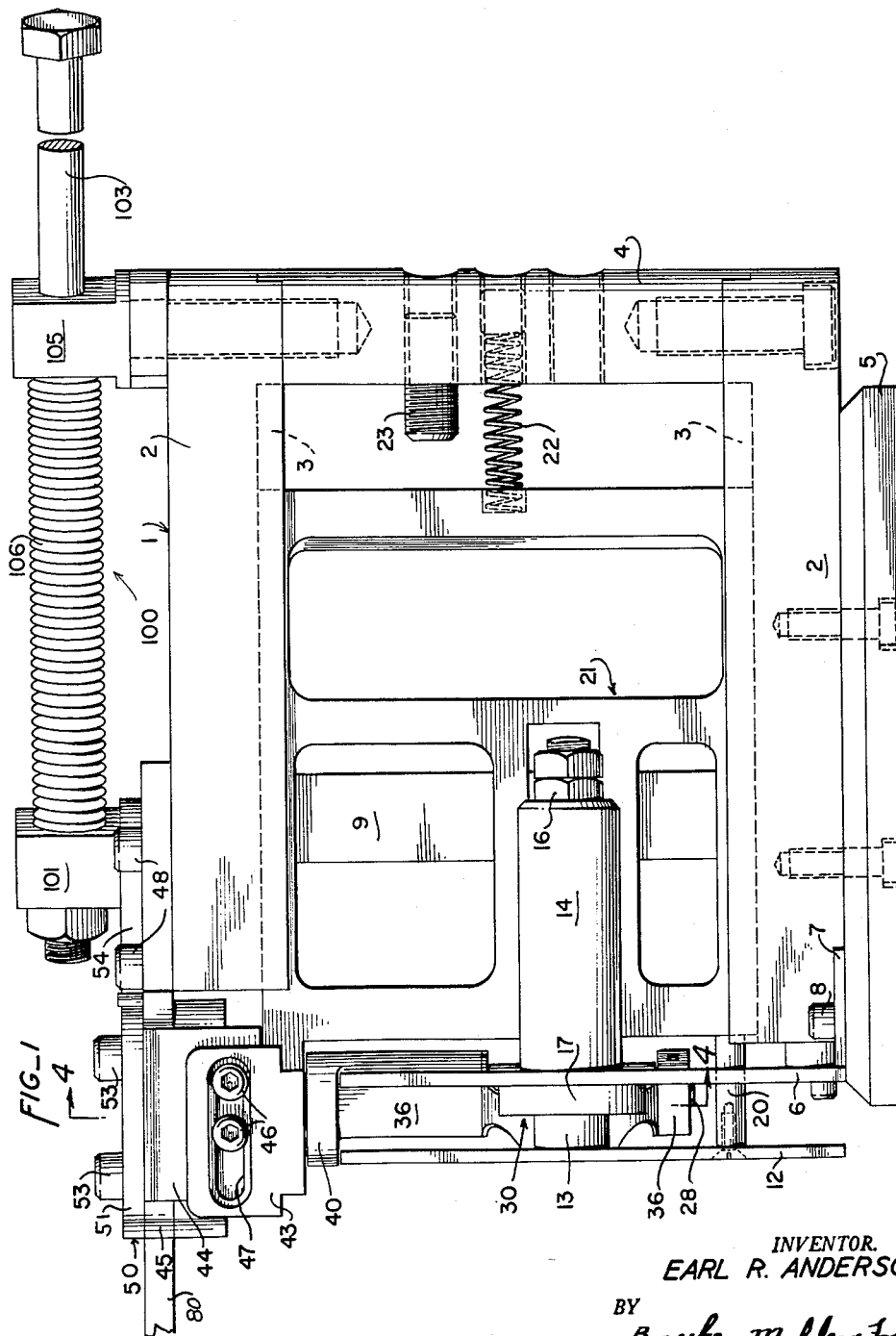
INVENTOR.
EARL R. ANDERSON
BY
ATTORNEYS

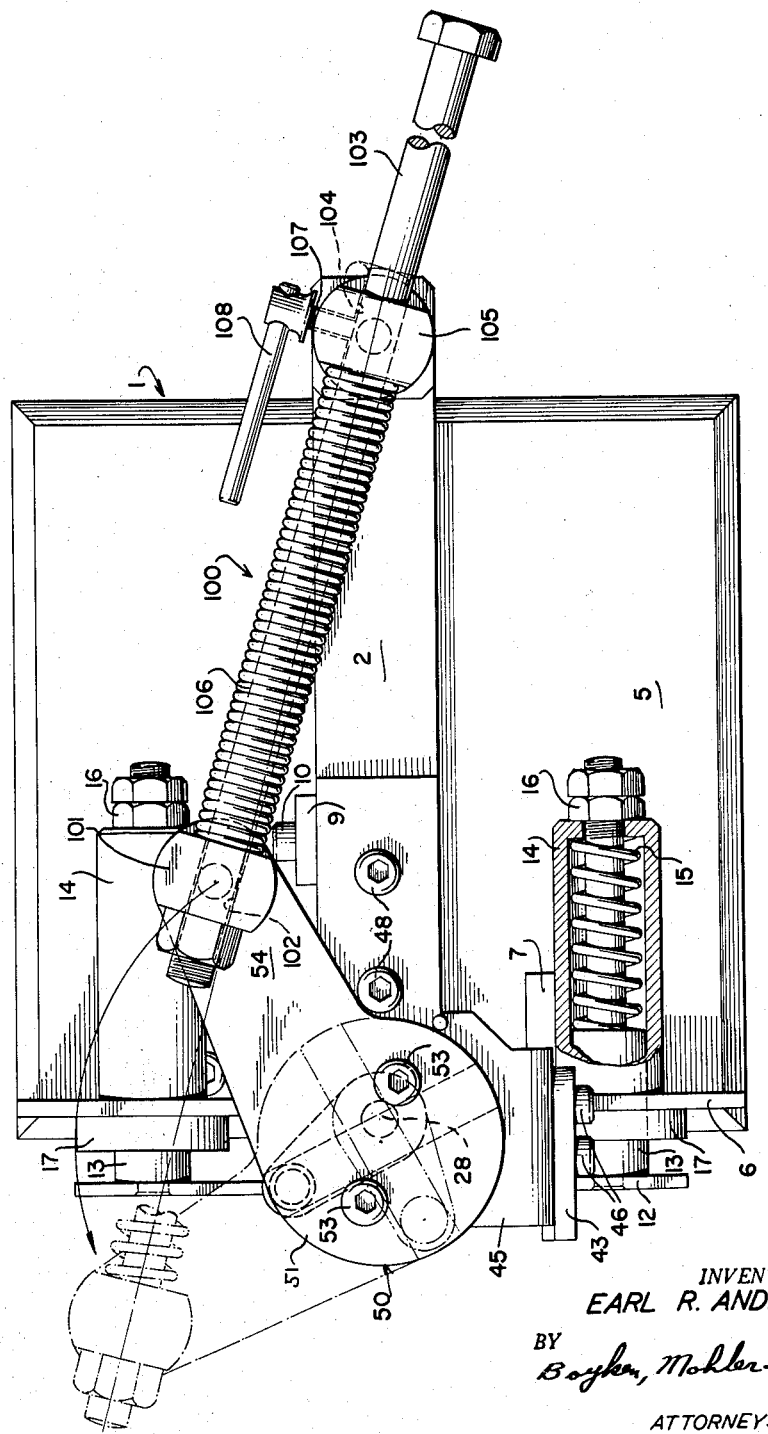

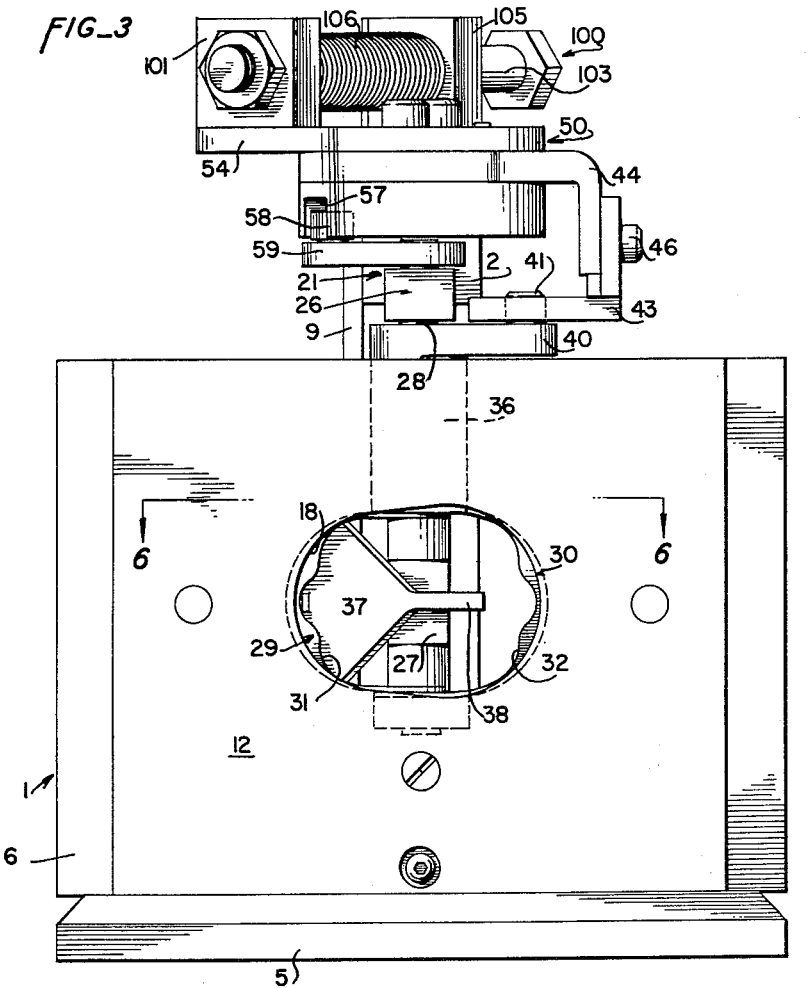

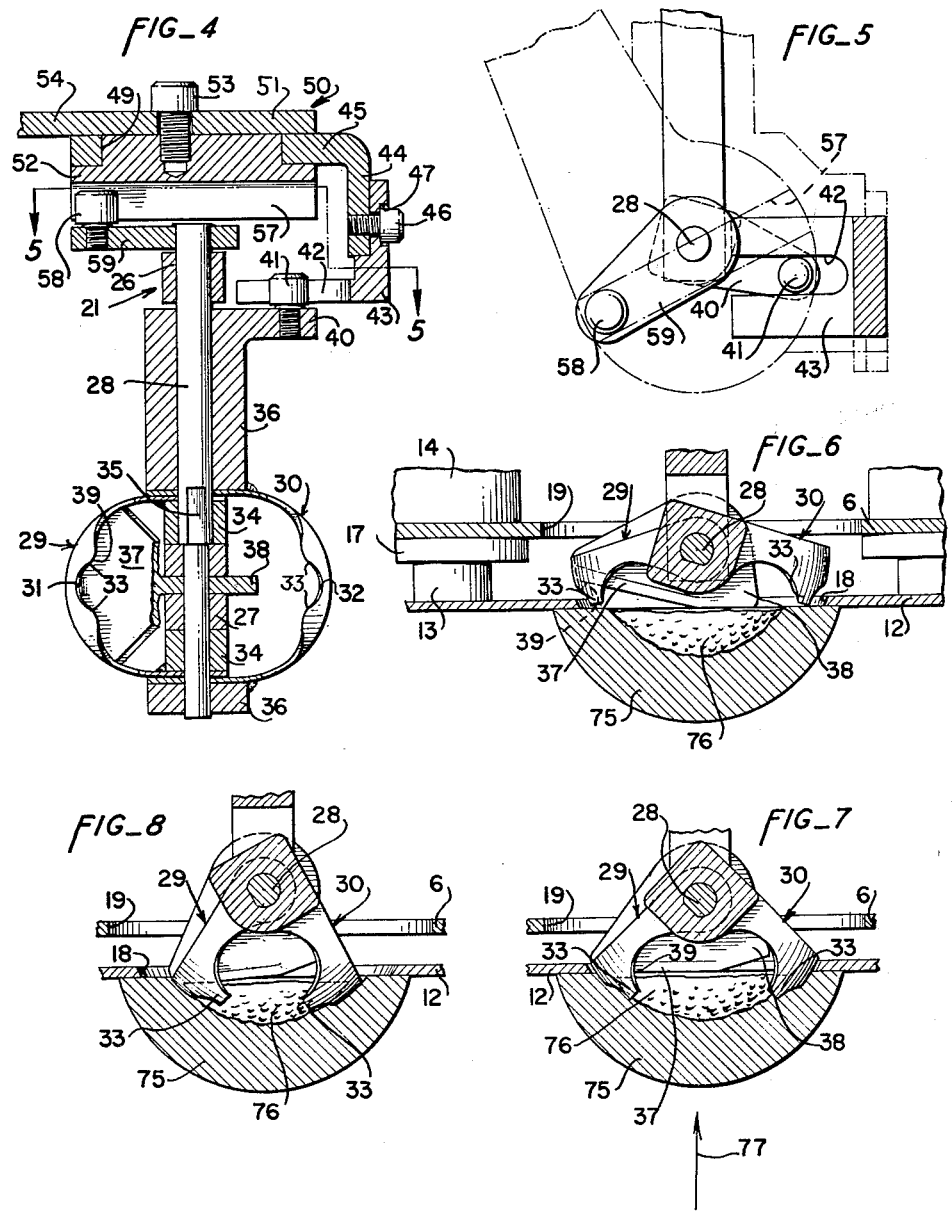

May 25, 1965  E. R. ANDERSON  3,185,195
PEACH PITTER
Original Filed Aug. 6, 1956  5 Sheets-Sheet 5
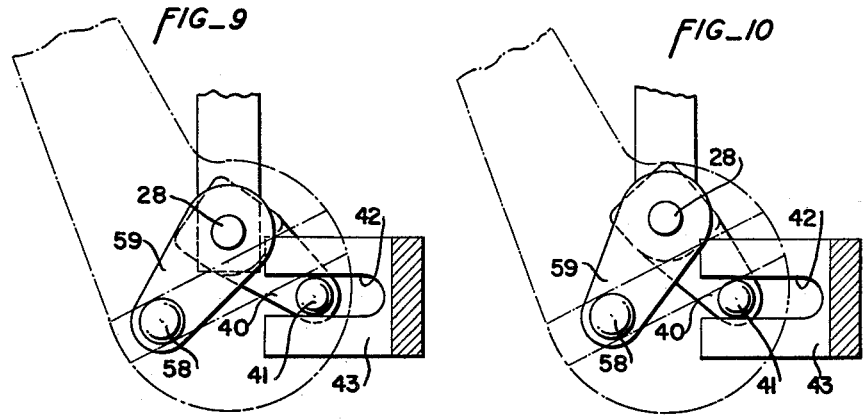
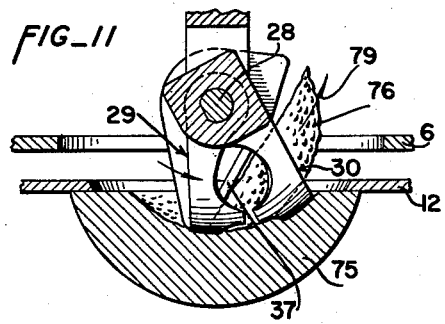
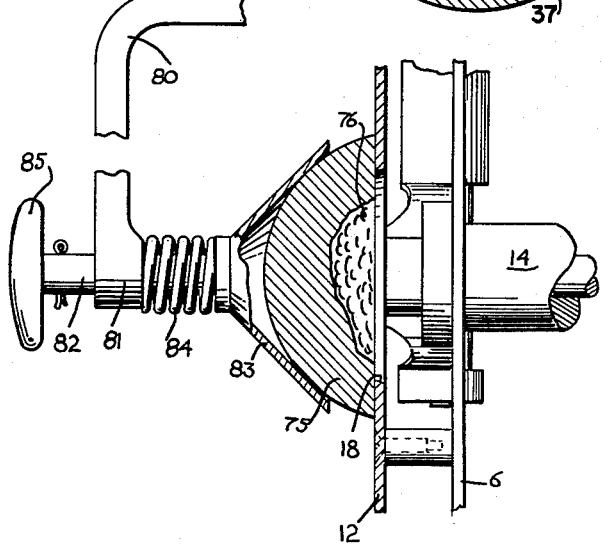
INVENTOR.
EARL R. ANDERSON
BY
Boyken, Mohler & Foster
ATTORNEYS 3,185,195
PEACH PITTER
Earl R. Anderson, Campbell, Calif., assignor to Filper Corporation, San Ramon, Calif., a corporation of California
Original application Aug. 6, 1956, Ser. No. 602,096, now Patent No. 3,075,566, dated Jan. 29, 1963. Divided and this application Nov. 16, 1962, Ser. No. 238,234
5 Claims. (Cl. 146—28)

This invention relates to the pitting of clingstone peaches and, more specifically, to the removal of pits from the peach halves to which the pits may be adhered and is a division of Serial No. 602,096, filed August 6, 1956, now U.S. Patent No. 3,075,566 issued January 29, 1963. The apparatus hereinafter described bears some features that are shown by my Patent No. 2,775,278, issued December 25, 1956.

One of the objects of this invention is the provision of a method of removing the half pits from clingstone peach halves by severing the fibers connecting the pit in each half with the flesh of the latter substantially at the adjoining surfaces of the pit and pit cavity by moving the pit along an arcuate path that is substantially in continuation of the curvature of the surface of the pit cavity.

Various prior art devices have been proposed for pitting whole peaches and like fruit of the clingstone variety, a recent development being shown in U.S. Letters Patent No. 2,664,127 issued December 29, 1953 to Joseph Perrelli, in which the pit is held and both peach halves are separated therefrom in one operation without cutting the pit from the fruit. In some cases, however, the fruit as it comes from the orchard may have a defective pit or a pit that is split, and which cannot be held by such apparatus. In such cases removal of a pit from one peach half at a time may be necessary.

Many types of apparatus for cutting a pit from a peach half have been proposed. However, it has been found desirable to separate the pit from clingstone peaches by tearing or rupturing the fibers that adhere the pit to the peach in order to prevent the loss of flesh, and also, it has been found that the flavor of peaches pitted in this manner is superior to those in which the pit and flesh adhering thereto has been completely cut from the peach half.

It is therefore another object of this invention to provide a novel method for pitting peach halves which includes rupturing a portion of the fibers which attach the pit to the peach.

Still another object of this invention is the provision of apparatus for performing the above method.

A further object of this invention is the provision of apparatus for imparting a shock to a pit adhered to a peach half while supporting the pit in a manner to eject the same from the peach half.

Yet another object of this invention is the provision of a method of pitting peach halves by partly cutting and partly rupturing the fibers adhering the pit to the peach half.

Other objects and advantages will become apparent from the description taken in connection with the accompanying drawings, in which:

FIG. 1 is a side elevational view, in full size, of the major portion of the apparatus of this invention;

FIG. 2 is a top plan view of the apparatus of FIG. 1;

FIG. 3 is a front end elevational view of the apparatus of FIG. 1;

FIG. 4 is a sectional view taken substantially along line 4—4 of FIG. 1;

FIG. 5 is a sectional view taken substantially along line 5—5 of FIG. 4 and showing the position of the driving mechanism of the apparatus at its original position;

FIG. 6 is a sectional view taken substantially along line 6—6 of FIG. 3 and showing the position of pitting elements as related to the driving mechanism of FIG. 5;

FIG. 7 is a sectional view similar to FIG. 6 showing the position of the pitting elements during the first step of the pitting operation;

FIG. 8 is a sectional view similar to FIG. 6 showing the position of the pitting elements at the end of the first step of the pitting operation;

FIGS. 9 and 10 are sectional views similar to FIG. 5 showing the position of the driving mechanism corresponding to the positions of the pitting elements of FIGS. 7, 8, respectively;

FIG. 11 is a sectional view similar to FIG. 6 showing the position of the pitting elements during the final pitting operation; and FIG. 12 is a partly elevational, partly sectional view of a portion of the apparatus of FIG. 1, showing peach holding means.

In detail, the apparatus of this invention comprises a frame, generally designated 1 (FIGS. 1, 2, 3), composed of a pair of generally horizontal, spaced guide members 2 having oppositely inwardly opening grooves 3 therein. Members 2 are rigidly secured in said spaced relation by a back frame member 4 (FIG. 1) and are rigidly fixed to a horizontal base plate 5. At the forward end of the base plate 5 the same is provided with an upstanding fixed plate 6 which may be rigidly secured to base 5 as by brackets 7 and screws 8. Since the upper end of plate 6 is not secured to upper guide member 2, the forward ends of said guide members may be held in spaced relationship by a side strap 9 (FIGS. 1, 2, 3) secured thereto by screws 10.

Mounted forwardly of fixed plate 6 and in a spaced, parallel relation thereto is a movable plate 12. Plate 12 is horizontally reciprocable with respect to plate 6 since it is mounted on a pair of horizontal rods 13 which extend into spring units 14 secured to the rear side of plate 6. Springs 15 (FIG. 2) in each spring unit 14 urge plate 12 away from plate 6 to the extent limited by stop nuts 16 threadedly received on rods 13. The inward movement of plate 12 toward plate 6 against the force of springs 15 is limited by spacer collars 17 surrounding rods 13 between plate 12 and plate 6. Plates 12 and 6 are formed with horizontally aligned openings 18, 19 respectively (FIGS. 3, 6), for a purpose to be described. Opening 19 may be formed slightly larger than opening 18 and the latter is a little larger than the largest pit expected to be encountered.

Extending rearwardly from movable plate 12 through an opening in plate 6 is a push rod 20 (FIG. 1). The forward end of push rod 20 is secured to plate 12 and its rearwardly directed end is adapted to engage the front end of a slide member 21 which is slidably received in grooves 3 in guide members 2. Slide member 21 is urged to its forward position (to the left in FIG. 1) by a helical spring 22 interposed between the rear end thereof and back member 4. The rearward travel of slide member 21 is limited by an adjustable screw 23 projecting forwardly from back member 4. The forward movement of member 21 is, of course, limited by stop nuts 16 in the same manner as movable plate 12. It will be noted that the original or forward position of member 21 with respect to plate 12 may be adjusted by interposing push rods 20 of different lengths therebetween.

The forward end of slide member 21 is formed to provide a pair of vertically spaced bearings 26, 27 (FIGS. 3, 4) in which the vertical drive shaft 28 is journalled. Shaft 28 is free to rotate in bearings 26, 27 and moves longitudinally of frame 1 with slide member 21. It will be noted from FIG. 6 that when slide member 21 is in its original or forward position, shaft 28 is positioned in the space between plates 6 and 12.

In FIG. 4 it will be seen that the lower end of shaft 28 carries a pair of arcuately formed, opposed pit holding elements or blades 29, 30. Blades 29, 30 are substantially U-shaped and their forwardly directed edges are sharpened to provide cutting edges 31, 32. Said cutting edges may be formed to the somewhat sinusoidal curve shown with their central portions recessed to provide a pair of nibs 33 on either side thereof. Preferably edges 31 are sharpened substantially throughout their arcuate extent.

The nibs 33 in effect form two portions which are the leading cutting edges of blades 29, 30. As will appear later, when blades 29, 30 cut into the flesh of a peach half adjacent the pit they leave an uncut area at the recess between the nibs 33.

Blade 29, which will hereinafter be referred to as the ejector blade, is provided at its inner ends with a pair of opposed bosses 34 having aligned openings for receiving the lower part of shaft 28 therethrough. Bosses 34 are secured as by welding to blade 29 and a flat 35 may be formed on shaft 28 for securing one of said bosses thereto by means of a key or set screw. In this manner, blade 29 is fixed to shaft 28 for rotation therewith.

Likewise the inner ends or legs of blade 30, hereinafter known as the supporting blade, are provided with a pair of opposed bosses 36 (FIG. 4) which also have aligned openings for receiving shaft 28. Bosses 36 are secured as by welding to blade 30 and are rotatable with respect to shaft 28. In effect, as seen in FIG. 4, blade 29 may rotate with shaft 28 inside of the arcuate extent of blade 30.

Blade 29 is further provided with an integral web 37 (FIGS. 3, 4, 6) extending inwardly from the outer arcuate portion of blade 29 to a central flange 38 positioned between bosses 34 and rotatably received on shaft 28. The outer portion of web 37 is spaced rearwardly from cutting edge 31 where it is secured to the arcuate portion of blade 29. Web 37 and the arcuate portion of blade 29 thereby form a pocket 39 (FIGS. 4, 6) for a purpose to be described.

In FIGS. 3, 4, 5 it will be noted that the upper end of upper boss 36 is formed with a crank arm 40 having a follower 41 projecting upwardly therefrom at a point eccentric to shaft 28. Follower 41 is slidably received in an elongated, horizontal slot 42 formed in a fixed bracket 43. Bracket 43 is adjustably secured to the downwardly extending leg 44 of a horizontal bearing member 45 as by screws 46 extending through slot 47 in bracket 43 (FIGS. 1, 4). Bearing member 45 is secured to upper guide member 2 by screws 48 (FIGS. 1, 2). It will be noted that the relative angular position of crank arm 40 and therefore of supporting blade 30 may be adjusted by sliding bracket 43 forwardly or rearwardly and securing it in the desired position by screws 46.

It will be noted in FIG. 4 that the axis of the cylindrical bearing 49 of member 45 is positioned in the central vertical plane of the slide member 21. A driving head 50 comprising an upper disc 51 and a lower circumferentially grooved disc 52 is journalled for rotation on bearing surface 49 of bearing member 45. Said discs may be secured together by screws 53 (FIGS. 1, 2) and are provided with a crank arm 54 for rotation head 50 in bearing member 45. The underside of disc 52 is provided with a horizontally elongated slot 57 (FIGS. 2, 4, 5) which slidably receives a follower 58 carried by a crank arm 59. Arm 59 is pinned to the upper end of shaft 28 for rotation therewith and follower 58 is eccentric with respect to said shaft. Rotation of driving head 50 by arm 54 thereby rotates shaft 28 through slot 57, follower 58, and crank arm 59. In this manner, ejector blade 29 may be rotated independently of supporting blade 30.

The drive for head 50 and thereby blade 29 is had through a trigger mechanism, generally designated 100, shown in FIGS. 1, 2, and 3. Swingably secured to the end of crank arm 54 remote from head 50 is an upstanding boss 101 having a horizontal aperture 102 (FIG. 2) therethrough for receiving one end of an elongated rod 103. The other end of rod 103 extends through an aperture 104 in a similar boss 105 swingably mounted on the rear end of upper guide member 2. A helical compression spring 106 surrounds rod 103 and abuts bosses 101, 105 at opposite ends.

Trigger mechanism 100 may be cocked by pulling rod 103 rearwardly and compressing spring 106 to the position shown in solid lines in FIG. 1. A set screw 107, provided with a handle 108, is threadedly received in boss 105 and projects into aperture 104 and may be tightened to secure rod 103 in the cocked position. Upon release by withdrawal of screw 107 spring 106 will forcibly and rapidly snap arm 54 and therefore head 50 to the dot-dash line position of FIG. 2, thereby imparting a rapid rotation to ejector blade 29 through slot 57, follower 58, crank arm 59 and shaft 28. This motion transmitted to blade 29 is in effect a shock or rapid blow, for a purpose to be described.

In operation, the half 75 (FIGS. 6, 7, 9 and 12) of a peach which has been bisected along its sutural plane is presented to the forward face of movable plate 12 with the pit 76 adhering to said peach half arranged generally centrally of opening 18 and being exposed therethrough. In this position, it will be noted that the sutural plane of the peach half and the pit corresponds generally to the plane of movable plate 12. The peach half 75 is then urged toward plate 12 along the central axis of peach half 75 and pit 76 normal to their sutural plane.

The apparatus shown in FIG. 12 may be provided for the above purpose. A bracket 80 (FIG. 1) extends outwardly and downwardly from member 45 and is provided with a bearing 81 (FIG. 12) at its lower end. Bearing 81 is aligned with the aforementioned peach axis and has a shaft 82 slidably mounted therein for reciprocation along said axis toward and away from plate 12. Shaft 82 carries a peach supporting cup 83 at its end closest to plate 12 and a helical coil spring 84 may be interposed between said cup and bearing 81 for yieldably urging the cut face of a peach half 75 supported in cup 83 into engagement with movable plate 12. A knob 85 may be provided on the opposite end of shaft 82 by which cup 83 may be retracted for feeding and ejecting peach halves to and from said cut. The devices of FIG. 12 thereby provide means for supporting or holding the peach half during the pitting operation to eliminate the possibility of an operator's hands coming too close to the pitting knives for safety.

At the first or original position shown in FIG. 6 it will be noted that the projecting nibs 33 of the cutting blades 29, 30 are adjacent the flat surface of the peach half 75 and just outside the ends of pit 76. The corresponding position of the elements of the mechanism for driving pitting elements 29, 30 is shown in FIG. 5.

Movable plate 12 is then urged toward fixed plate 6 by pressing on peach half 75 in the direction indicated by arrow 77 in FIG. 7. If desired, this may be done by spring 84 of holder 83, or manually. This rearward movement of plate 12, is, of course, limited by collars 17 (FIGS. 2, 6). In moving rearwardly plate 12 drives slide member 21 back against the force of spring 22 (FIG. 1) through push rod 20. Slide 21 carries drive shaft 28 of the blades with it thereby displacing said shaft with respect to the other elements of the blade driving mechanism. Since followers 41 and 58 are prevented from any substantial rearward movement by slots 42 and 57 respectively, which are held stationary during the above movement, the effect of moving the shaft 28 rearwardly is to rotate crank arms 40 and 59 thereby closing blades 29, 30 respectively toward each other. Blades 29, 30 are closed to the position shown in FIG. 7 around opposite ends of pit 76 and nibs 33 actually cut into the flesh of peach half 75 adjacent said pit. The position of crank arms 40, 59 corresponding to this position of blades 30, 29, is shown in FIG. 9.

In the event the pit 76 is smaller than the largest pit that may be accommodated by the pitting elements 29, 30, the same may be further closed against the pit by grasping the rear of slide member 21 and retracting it further, independently of movable plate 12 to the position shown in FIG. 8. The corresponding drive mechanism position is shown in FIG. 10.

The configuration of cutting edges 31, 32 are such that the blades 29, 30 do not make a full cut around the pit 76, but the recess between nibs 33 leaves part of the pit adhered to the peach half. It is desirable that as much of the pit remain adhered to the peach as possible for the following pitting step consistent with relieving the edges of the pit and trimming the pit cavity.

It will be noted that ejector blade 29 has been rotated sufficiently to bring web 37 thereof into contact with the surface of pit 76 opposite peach half 75 (FIG. 7) One end of pit 76 is therefore received in the pocket 39 formed between the cutting edge of blade 29 and said web. Although the drawing discloses a half pit with web 37 in contact with the flat face thereof, it should be noted that the means here described will work as effectively in cases where a whole pit is adhered to a peach half. It may be necessary in such cases to form web 37 to a concave shape so that a configuration of pocket 39 more nearly approaches the shape of the end of the whole pit. However, this is not absolutely necessary as the end of the pit will be received and held in pocket 39 when formed as shown in FIG. 7.

At this point, the trigger mechanism 100 is tripped by withdrawing screw 107 and spring 106 forces arm 54 forward rapidly as described. The blow or rapid rotation thus imparted to pitting element 29 ruptures the remaining fibers that adhere pit 76 to peach half and shocks the pit loose from its cavity (FIG. 11).

It will be noted that supporting element 30 cradles the underside of the pit adjacent the flesh of the peach half during this final pitting step. Not only does blade 30 trim the portion of the pit cavity adjacent the sutural plane of the peach but it also acts to guide the pit through blade 30 and out of the pit cavity in the direction of arrow 79.

The cavity of a peach half pitted in accordance with the method and apparatus of this invention substantially retains the desirable characteristics of a rough, colored surface and yet is trimmed clean of pit fragments and damaged flesh. The apparatus of this invention, in effect, combines some of the best features of cutting and tearing the pit from a peach half. Although the invention has been described and illustrated in detail, such should not be taken as restrictive thereof since it is obvious that many modifications could be made therein without departing from the spirit and scope of the invention.

I claim:

1. A device for pitting a drupe half having a cut face and pit adhered in the concave pit cavity therein, comprising:
   (a) pit engaging means for engaging an outer peripheral edge of said pit at a point adjacent to said cut face;
   (b) drupe supporting means for supporting said half in a position for said engagement of said pit by said pit engaging means;
   (c) means supporting said pit engaging means for arcuate movement into said pit cavity and transversely of the plane of said cut face and past said plane to a point adjacent to the bottom of said cavity along a path generally following the concave curvature of the surface of said cavity when said drupe half is in said position;
   (d) actuating means connected with said pit engaging means for so moving the latter along said path whereby said pit will be ejected from said cavity by and ahead of said pit engaging means.

2. A device for pitting a drupe half having a cut face and pit adhered in the concave pit cavity therein, comprising:
   (a) pit engaging means for engaging an outer peripheral edge of said pit at a point adjacent to said cut face;
   (b) drupe supporting means for supporting said half in a position for said engagement of said pit by said pit engaging means;
   (c) means supporting said pit engaging means for arcuate movement into said pit cavity and transversely of the plane of said cut face and past said plane to a point adjacent to the bottom of said cavity along a path generally following the concave curvature of the surface of said cavity when said drupe half is in said position;
   (d) actuating means connected with said pit engaging means for so moving the latter along said path whereby said pit will be ejected from said cavity by and ahead of said pit engaging means;
   (e) an element rigidly connected with said pit engaging means for movement therewith and offset relative to the latter in a direction away from said pit at said point and extending over said pit when said drupe half is in said position for holding said pit thereagainst during movement of said pit out of said cavity under the influence of said pit engaging means.

3. A device for pitting a drupe half having a cut face and pit adhered in the concave pit cavity therein, comprising:
   (a) pit engaging means for engaging an outer peripheral edge of said pit at the point adjacent to said cut face;
   (b) drupe supporting means for supporting said half in a position for said engagement of said pit by said pit engaging means;
   (c) means supporting said pit engaging means for arcuate movement into said pit cavity and along a path generally following the concave curvature of said cavity when said drupe half is in said position;
   (d) actuating means connected with said pit engaging means for so moving the latter along said path whereby said pit will be ejected from said cavity by and ahead of said pit engaging means;
   (e) guide means adjacent to the edge of said pit opposite to said point adapted to engage and to guide said pit out of said half along a path substantially in continuation of the arcuate path of said pit engaging means through said cavity upon actuation of said pit engaging means to move said pit out of said cavity.

4. A device for pitting a drupe half having a cut face and pit adhered in the concave pit cavity therein, comprising:
   (a) a pit engaging means for engaging an outer peripheral edge of said pit at a point adjacent to said cut face;
   (b) drupe supporting means for supporting said half in a position for said engagement of said pit by said pit engaging means;
   (c) means supporting said pit engaging means for arcuate movement into said pit cavity and along a path generally following the concave curvature of said cavity when said drupe half is in said position;
   (d) actuating means connected with said pit engaging means for so moving the latter along said path whereby said pit will be ejected from said cavity and ahead of said pit engaging means;
   (e) said pit engaging means being a generally U-shaped member, the closed end of which is adapted to generally conform to the concave contour of said pit cavity;
   (f) said means supporting said pit engaging means including coaxial pivots supporting the ends of the sides of said U-shaped member for swinging said closed end thereof along said path.
5. In a structure as defined in claim 3:
(f) said means including a generally U-shaped blade the closed end of which generally follows the concave contour of said pit cavity and over which said pit is adapted to be moved under the influence of said pit engaging means.

References Cited by the Examiner
UNITED STATES PATENTS

| | | |
|---|---|---|
| 2,108,535 | 2/38 | Jepson. |
| 2,216,165 | 10/40 | Ewald et al. |
| 2,302,688 | 11/42 | Ewald. |
| 2,652,872 | 9/53 | Keesling. |
| 2,818,098 | 12/57 | Perrelli. |

J. SPENCER OVERHOLSER, *Primary Examiner.*